Feb. 3, 1942.  W. A. EDINGTON  2,272,112
STOVE LID LIFTER
Filed Dec. 16, 1940
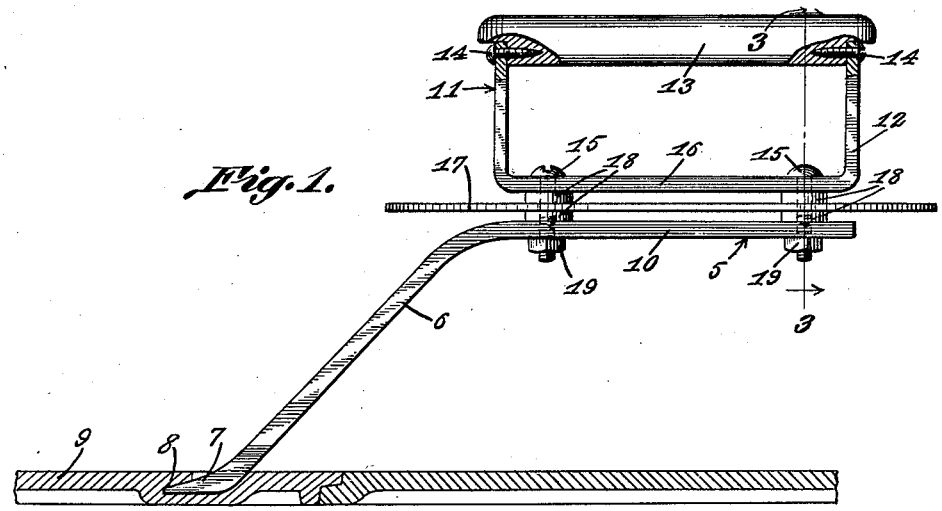
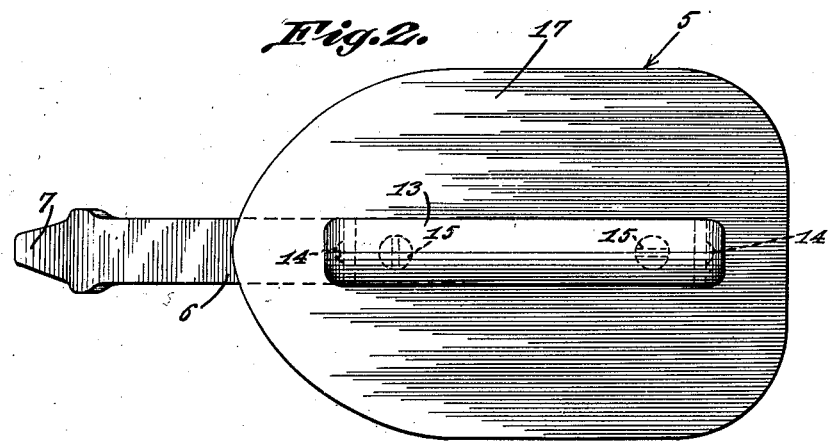
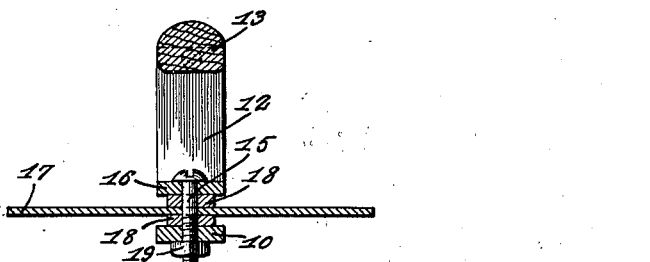
William A. Edington, INVENTOR
BY Victor J. Evans & Co.
ATTORNEYS Patented Feb. 3, 1942

2,272,112

UNITED STATES PATENT OFFICE 2,272,112

STOVE LID LIFTER

William A. Edington, Shreveport, La.

Application December 16, 1940, Serial No. 370,405

2 Claims. (Cl. 294—12)

The present invention relates to a new and improved stove lid lifter.

The primary object of the invention resides in the provision of a stove lid lifter designed to protect the hand of the user from being burned while lifting a lid from a heated stove.

A further object of the invention resides in the provision of a stove lid lifter that is simple in construction, relatively inexpensive to manufacture and embodying a minimum number of movable parts.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevational view partly in section of the improved stove lid lifter being shown in use, the lid of the stove being shown in section.

Figure 2 is a top plan view.

Figure 3 is a vertical sectional view taken substantially on line 3—3 of Figure 1.

Referring to the drawing for a more detailed description thereof, the improved stove lid lifter is generally designated by the reference numeral 5 and comprises a lifter body 6 of arcuate formation, one end thereof being formed with a prong 7 adapted to engage the eye 8 of a stove lid 9. The shape of the hooked end 7 is similar to that of conventional stove lid lifters.

The body 6 further includes a substantially horizontal portion 10 to which a handle 11 is attached, it being observed that the handle is disposed at an angle relative to the end 7. The handle 11 includes a substantially U-shaped member 12, the upper ends of which support therebetween a hand grip 13, said grip being attached by means of screws or the like 14. As is to be understood, the hand grip 13 may be formed of wood, fibre or other material.

The U-shaped member 12 is adapted to be attached to the horizontal portion 10 by means of bolts 15, said bolts passing through aligned apertures formed in the horizontal section 16 of the member 12 and the horizontal portion 10 of the body 6, respectively.

Between the handle 11 and the horizontal body portion 10 there is disposed an elongated plate 17 formed of any desired material forming a heat shield. The shield 17 is spaced from the handle 11 and the body 6 by means of the washers 18, the same being disposed on each side of the shield 17 as clearly shown in Figure 3 of the drawing. Use of the washers 18 also forms an air space on either side of the shield 17 which aids in further preventing the hand grip 13 from becoming overheated. Cap nuts 19 maintain the bolts 15 and washers 18 in clamping engagement with the handle 11, shield 17 and body 6, respectively.

The lid lifter in accordance with the present invention including the use of the shield 17 will maintain the hand grip 13 in condition at all times to be engaged without fear of burning or otherwise injuring the hand. Even though the lifter remain in contact with the lid for an appreciable length of time, the hand grip can be engaged for lifting the lid without injury to the hand since the hand grip is prevented from becoming overheated by provision of the shield 17.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a stove lid lifting device, a lifting member having an elongated straight portion at one end and a lid lifting projection at the opposite end, an open rectangular shaped handle having an elongated straight inner portion approximately parallel with the straight portion of the lifting member, a plate of heat insulating material disposed between the handle and the straight portion of the lifting member, a plurality of fastening elements extended through the said parallel portions and the plate and rigidly connecting the same, and means for retaining the plate in spaced relation relative to the said handle and lifing member.

2. In a stove lid lifting device, an elongated lid lifting bar having an intermediate portion shaped at one end to form a projecting lid engaging prong and having a straight connecting portion at its outer end disposed in angular relation to the said intermediate portion, an open rectangular shaped handle member having an inner straight portion disposed parallel with and adjacent to the outer straight portion of the lifter, an elongated relatively thin plate of insulating material mounted between the handle and lifter and arranged in a plane parallel with the parallel portions of the handle and lifter, a pair of spaced apart fastening elements extended through the said parallel portions of the handle and lifter and through the plate to rigidly fasten the same in assembly, and a plurality of spacing elements fitted about the said fastening elements between the plate and respective straight portions of the handle and lifter for maintaining the plate in spaced relation to the said handle and lifter.

WILLIAM A. EDINGTON.